(No Model.) 5 Sheets—Sheet 1.

G. B. MASSEY, Dec'd.
S. R. Massey & S. A. Bryant, Administrators.
TICKET PRINTING MACHINE.

No. 443,969. Patented Dec. 30, 1890.

WITNESSES:

INVENTOR:
G. B. Massey, deceased
S. R. Massey
S. A. Bryant, Administrators
BY Munn & Co.
ATTORNEYS

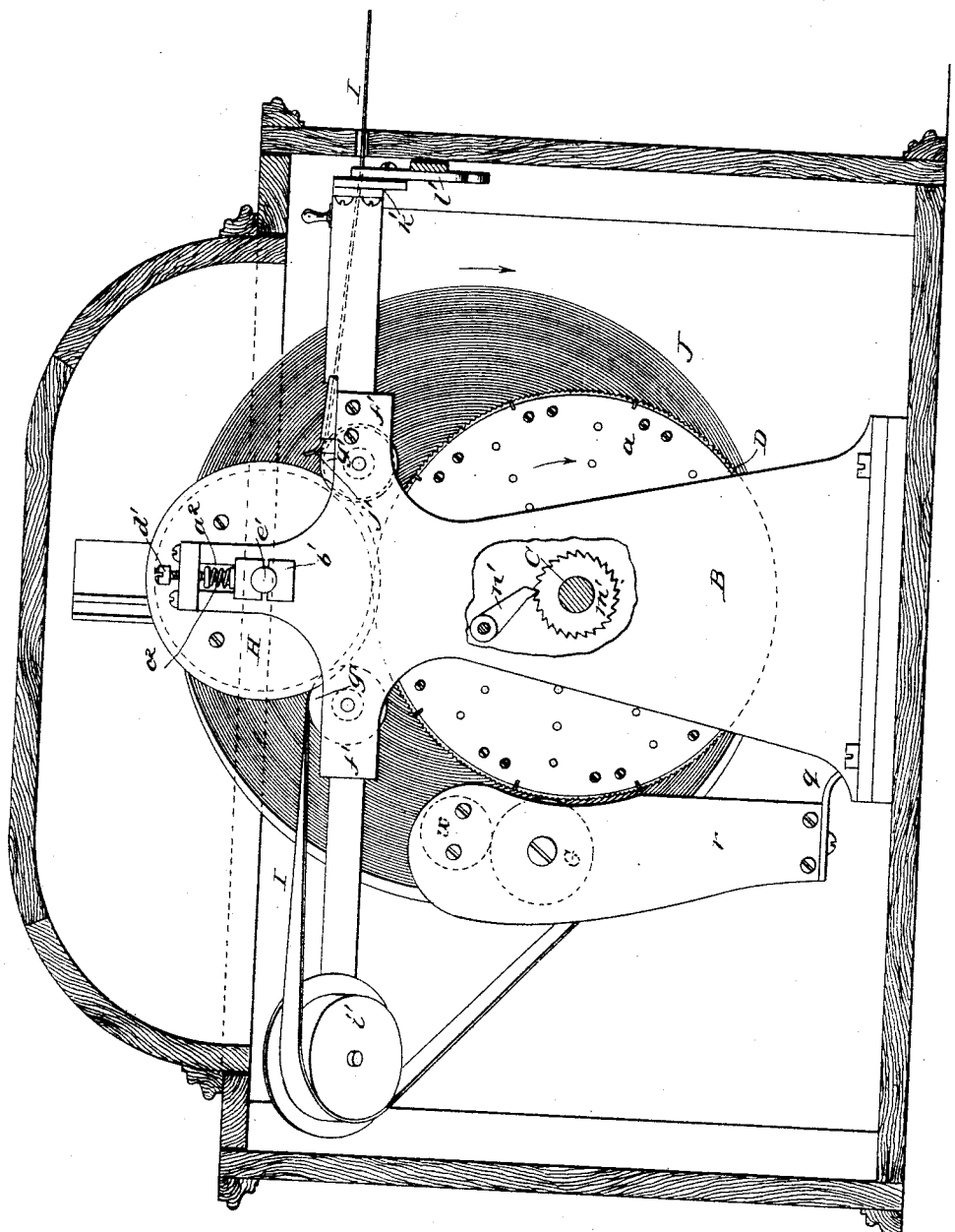

(No Model.)  5 Sheets—Sheet 3.
G. B. MASSEY, Dec'd.
S. R. MASSEY & S. A. BRYANT, Administrators.
TICKET PRINTING MACHINE.
No. 443,969.  Patented Dec. 30, 1890.
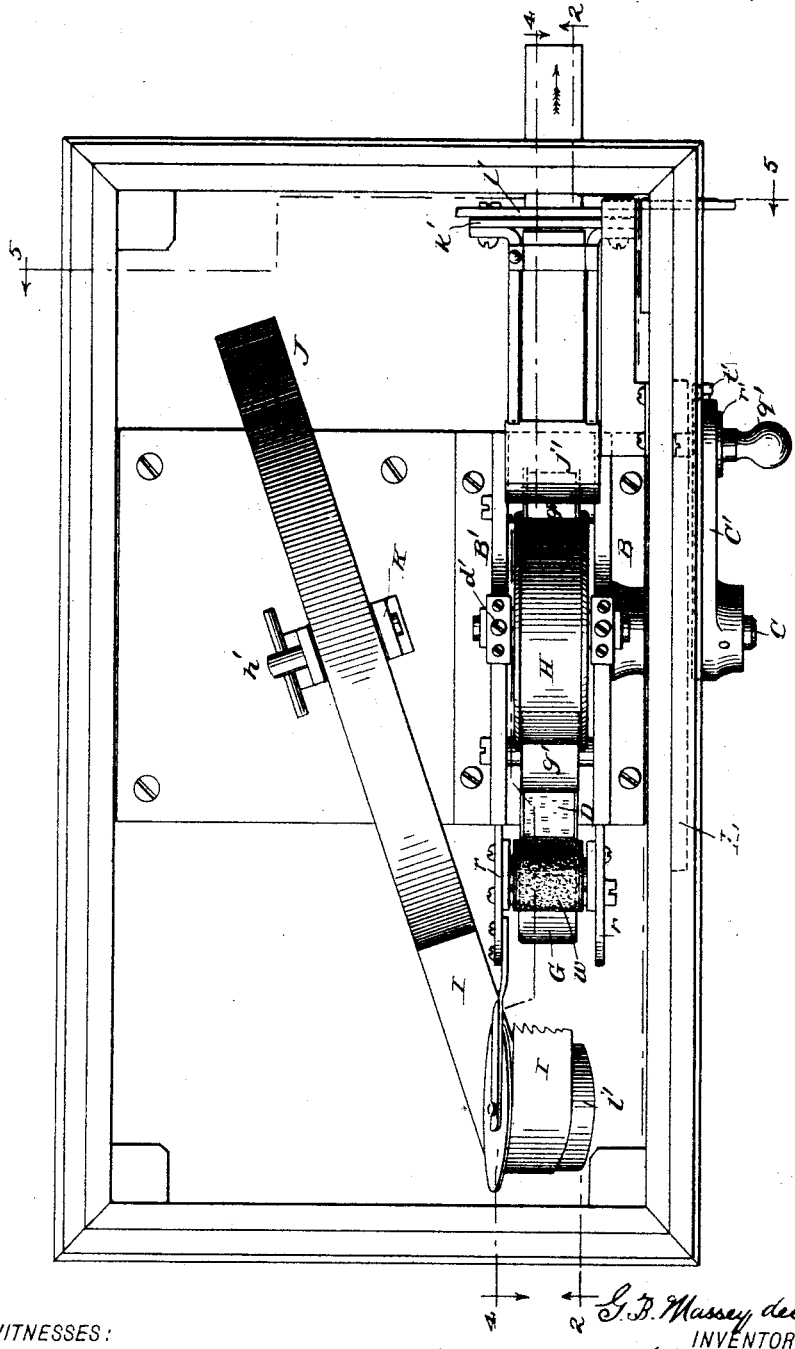
WITNESSES:
INVENTOR:
G. B. Massey deceased
S. R. Massey
S. A. Bryant
BY Administrators
Munn & Co.
ATTORNEYS (No Model.)  5 Sheets—Sheet 4.
G. B. MASSEY, Dec'd.
S. R. MASSEY & S. A. BRYANT, Administrators.
TICKET PRINTING MACHINE.
No. 443,969.  Patented Dec. 30, 1890.
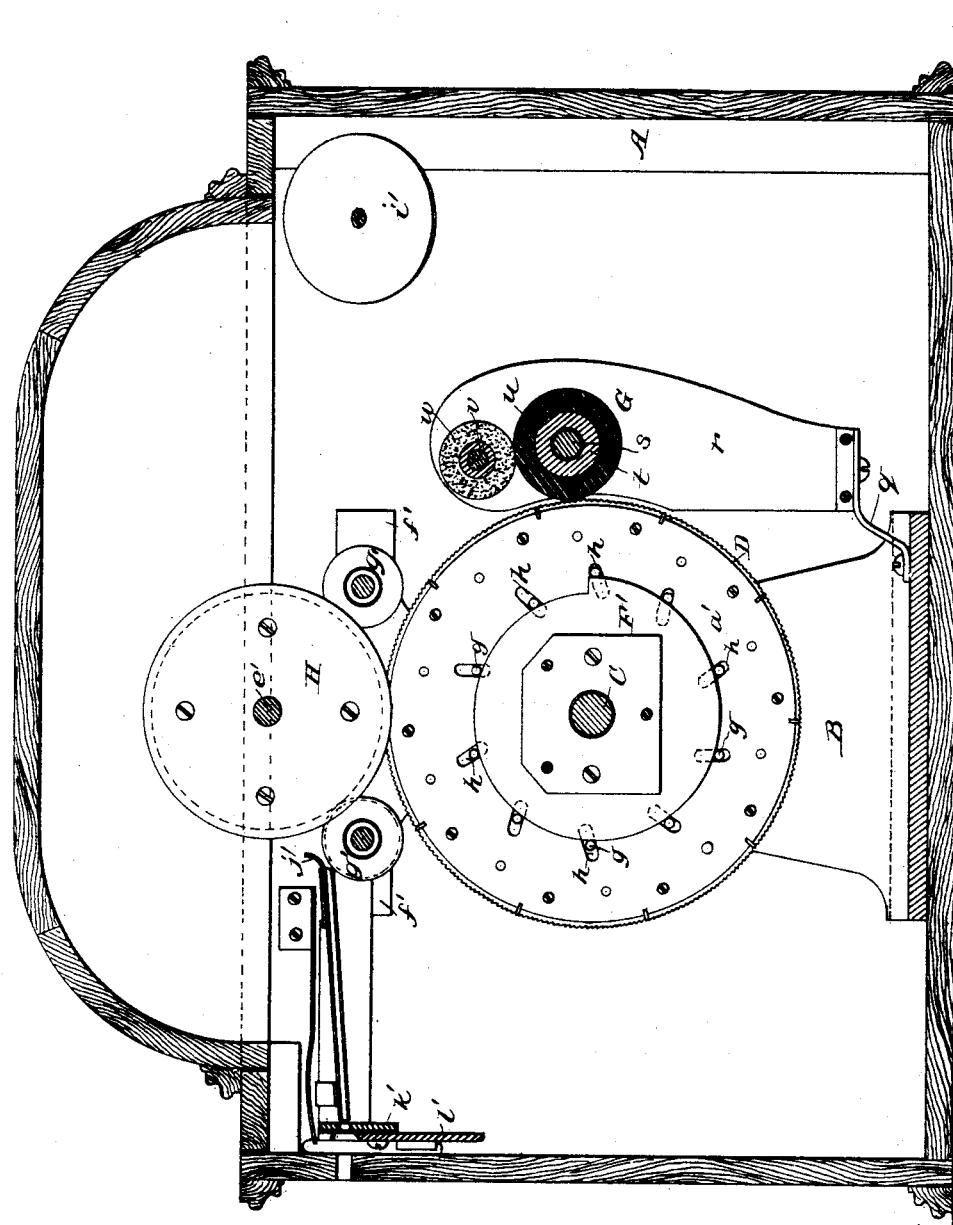
WITNESSES:
INVENTOR:
G. B. Massey deceased
S. R. Massey
S. A. Bryant
BY  Administrators
Munn & Co.
ATTORNEYS (No Model.) 5 Sheets—Sheet 5.
G. B. MASSEY, Dec'd.
S. R. Massey & S. A. Bryant, Administrators.
TICKET PRINTING MACHINE.
No. 443,969. Patented Dec. 30, 1890.
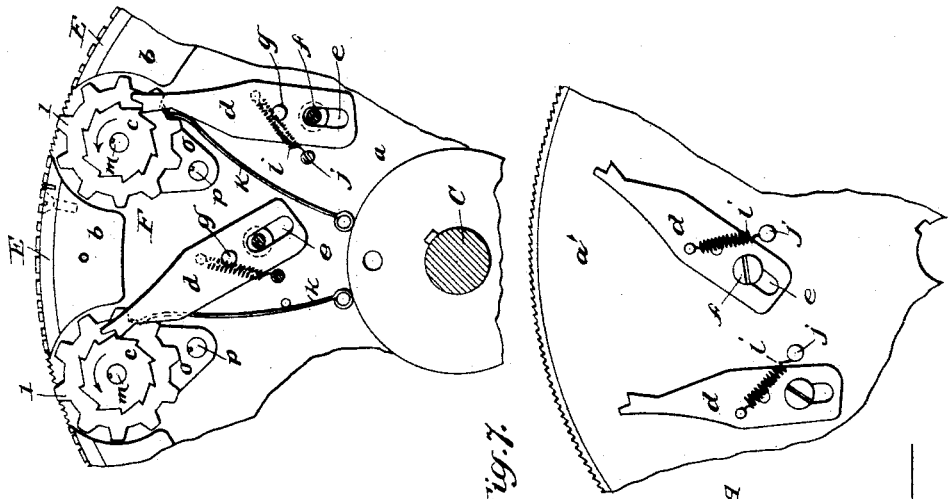
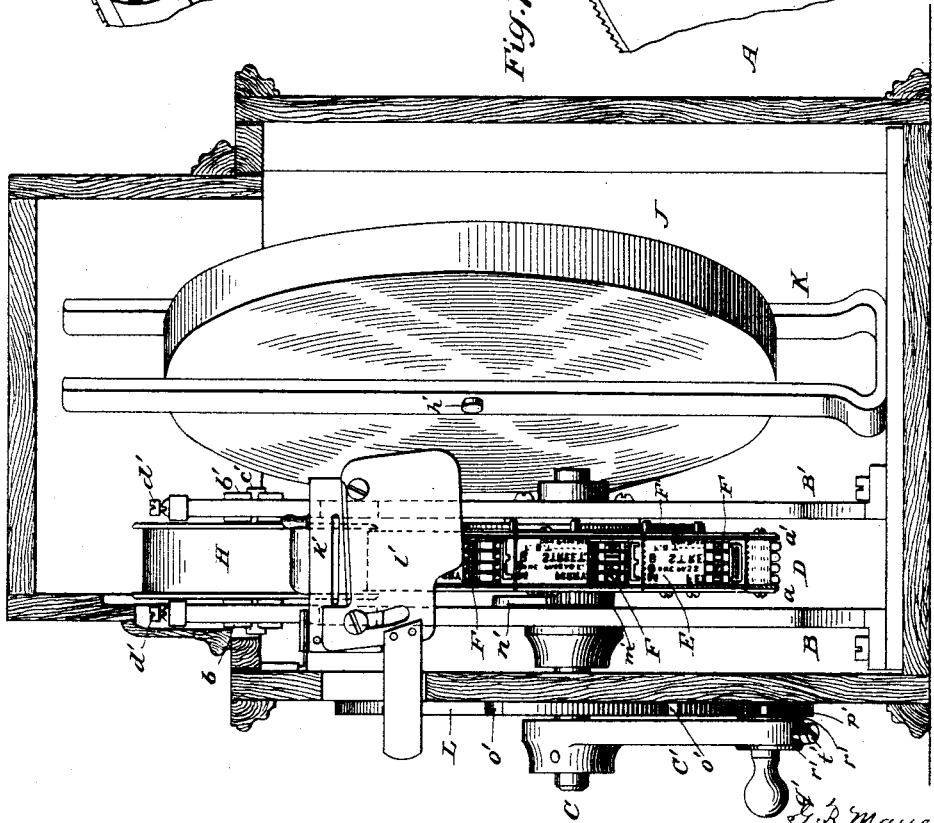
WITNESSES:
J. E. Criswell
C. Sedgwick
INVENTOR: G. B. Massey, deceased
S. R. Massey
S. A. Bryant
Administrators
BY Munn & Co.
ATTORNEYS

UNITED STATES PATENT OFFICE.

SARAH R. MASSEY AND STANLEY A. BRYANT, OF MAMARONECK, NEW YORK, ADMINISTRATORS OF THE ESTATE OF GIDEON B. MASSEY, DECEASED.

TICKET-PRINTING MACHINE.

SPECIFICATION forming part of Letters Patent No. 443,969, dated December 30, 1890.

Application filed February 18, 1890. Serial No. 340,886. (No model.)

*To all whom it may concern:*

Be it known that GIDEON B. MASSEY, deceased, late a resident of Mamaroneck, in the county of Westchester and State of New York, did invent a certain new and Improved Ticket-Printing Machine, of which the following is a specification, reference being had to the annexed drawings, forming a part thereof, in which—

Figure 1:
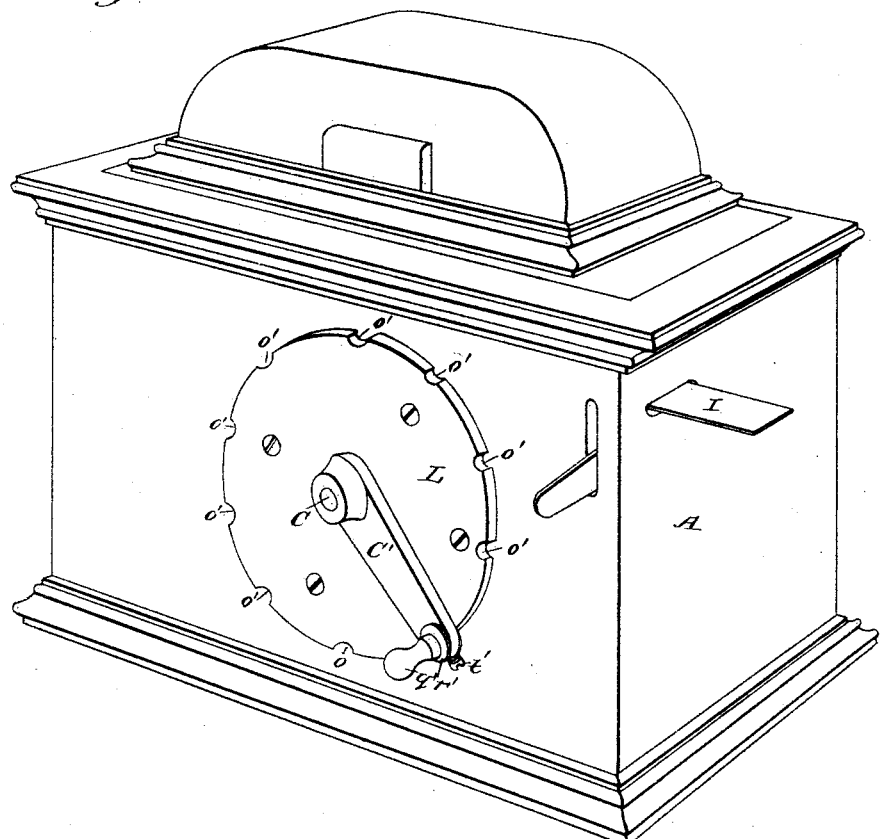
Figure 10:
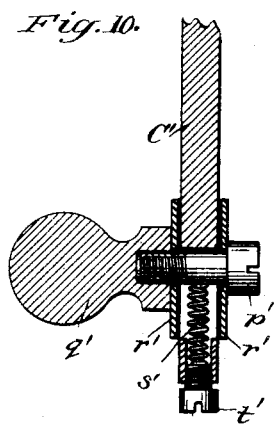
Figure 9:
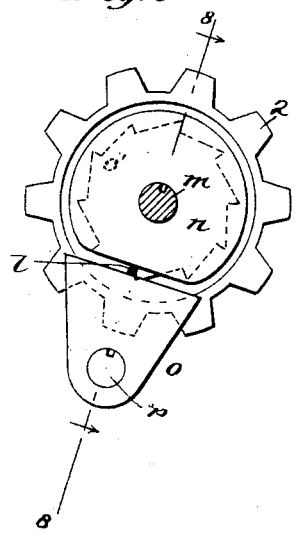
Figure 8:
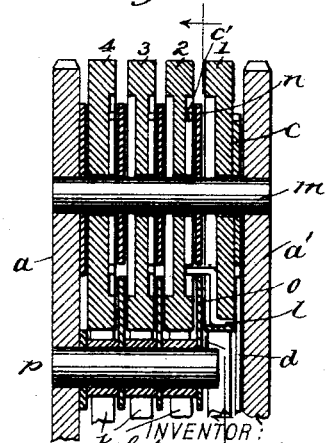

Figure 1 is a perspective view of the improved ticket-printing machine. Fig. 2 is a vertical longitudinal section taken on line 2 2 in Fig. 3. Fig. 3 is a plan view of the machine with the cover removed. Fig. 4 is a vertical longitudinal section taken on line 4 4 in Fig. 2. Fig. 5 is a vertical transverse section taken on line 5 5 in Fig. 3. Fig. 6 is an enlarged detail view of the ticket-numbering mechanism. Fig. 7 is an enlarged detail view showing the pawl for moving the number-wheel. Fig. 8 is a vertical transverse section of one series of number-wheels, taken on line 8 8 in Fig. 9. Fig. 9 is a side elevation of one of the number-wheels, showing the carrying mechanism; and Fig. 10 is an enlarged sectional view of the crank for operating the machine.

Similar letters and figures of reference indicate corresponding parts in all of the views.

The object of the invention is to construct a ticket-printing machine which will print and number the tickets in successive series, the ticket-blanks being supplied to the machine from a roll of continuous paper and cut off as they are delivered from the machine either singly or in strips containing a number of tickets, as may be required.

The invention consists in a wheel carrying a number of electrotypes for printing the body of the ticket, each electrotype being provided with a letter representing a series, a set of numbering-wheels adjacent to each electrotype and adapted to register a number of impressions equal to one-tenth or some integral part of the entire series of tickets which the machine is capable of printing, mechanism for moving the first number-wheel of each series by a step-by-step movement, a carrying mechanism for actuating the other wheels of the series, a disk provided with notches corresponding in number and position with the electrotypes carried by the printing-wheel, a handle mounted on the shaft of the printing-wheel and provided with a stop-pin adapted to stop in the notches of the disk, a spring-supported inking-roller, a fountain-roller for supplying the inking-roller with ink, and devices for guiding the paper strip through the printing mechanism, all as will be hereinafter more fully described.

The invention is more especially designed for printing railway, ferry, and bridge tickets; but it may be used in any place when tickets are desired in series.

To the bottom of the casing A are attached the standards B B', in which is journaled a shaft C, carrying the ticket-printing wheel D between the said standards B B'. The wheel D is formed of the serrated side plates $a$ $a'$, between which are secured the blocks $b$, to which are attached the electrotype-plates E. The ends of the blocks $b$ are concaved, as shown in Fig. 6, to adapt them to the numbering mechanism F. There are ten blocks $b$ in the periphery of the wheel and ten electrotypes, said electrotypes being similar to each other, with the exception of the series letter, a different letter being placed upon each electrotype.

The numbering mechanism in the present case consists of series of four wheels 1 2 3 4, each carrying ten characters. The first wheel 1 of each series is provided with a ratchet-wheel $c$, which is adapted to be engaged by the pawl $d$, pivoted on the plate $a'$. The said pawl $d$ is provided at its pivotal end with a slot $e$, which receives a stud $f$, projecting from the side plate $a'$, and the said pawl is furnished with a stud $g$, which projects through a slot $h$ in the said side plate $a'$. A spiral spring $i$, attached to the pawl $d$ and to the fixed pin $j$, projecting from the plate $a$, tends to draw the pawl inward toward the ratchet-wheel $c$ and also toward the pivotal stud $f$. A snail F', secured to the standard B', engages all of the studs $g$, and the said studs ride upon the snail F' as the wheel D is turned in the operation of printing. The snail is adapted to push forward the pawls $d$ during one revolution of the wheel D a sufficient distance to carry forward the ratchet-wheels $c$ one notch. This change of the numbering mechanism takes place before the electrotype-plates and the numbering-wheels arrive at the inking-roller G, so that the numbering-wheels as changed are inked along with the electrotype which prints the body of the ticket.

The wheel 1 is prevented from moving by its own momentum by a spring $k$, which is attached to the plate $a'$ at one end, while the opposite end is adapted to fit into the notches in the periphery of the number-wheel. The end of the spring $k$ is beveled, so as to admit of moving the wheel forward one step at a time; but it offers a sufficient resistance to prevent the wheel from being moved accidentally or by its own momentum. The wheel 1 of each series F carries a crank-wire $l$, one arm of which is inserted in an aperture in the wheel 1, the other arm projecting from the wheel at right angles toward wheel 2, as shown in Fig. 8. Wheel 2 is provided with a ratchet-wheel $c'$. The pin $m$, which supports the wheels 1 2 3 4, is grooved longitudinally, and upon the said pin is mounted a disk $n$, which is prevented from turning by a projection on the disk entering the groove of the pin $m$. One edge of the disk $n$ is cut away, and below the disk is supported a plate $o$, whose upper edge is parallel with the straight edge of the disk $n$ and separated a short distance from it to permit of the passage of the crank-wire $l$. The ratchet-wheel $c'$ is placed within a recess in the side of the number-wheel 2, and the outer wall of the said recess, the disk $n$, and plate $o$ form a guide for the end of the crank-wire $l$. As the number-wheel 1 makes a revolution, the crank-wire $l$ passes into the straight slot between the disk $n$ and plate $o$. It engages one of the teeth of the ratchet-wheel $c'$, and carries it forward so as to cause the wheel to make one-tenth of a revolution. In a similar way number-wheels 2 and 3 are provided with crank-wires $l$, and the number-wheels 3 and 4 are furnished with disks $n$ and plates $o$. The entire series of plates $o$ is supported upon a longitudinally-grooved stud $p$, which projects inwardly on the side plate $a$ of the wheel D.

To the base of the machine is secured a spring $q$, to which is attached an upright frame $r$, carrying a pin $s$, upon which is journaled the inking-roller G, the said inking-roller being formed of the metallic core $t$ and a rubber ring $u$. The roller G is held in contact with the periphery of the wheel D by the pressure of the spring $q$. Upon a pin $v$, projecting from the plate $r$, is mounted a felt-wheel $w$, which forms a reservoir of ink. The said felt-wheel $w$ rolls in contact with the inking-roller G, and supplies ink to the said roller to be transferred to the electrotypes and to the numbering-wheels carried by the wheel D.

In the slots $a^2$ in the upper ends of the standards B B' are placed journal-boxes $b'$, which are pressed downwardly by spiral springs $c^2$, the pressure of which is adjusted by screws $d'$. In the journal-boxes $b'$ is journaled a shaft $e'$, upon which is mounted the impression-roller H. The periphery of the impression-roller is covered with soft rubber or analogous material. In arms $f'$, projecting from opposite sides of the standards B B', are journaled rollers $g'$, which guide the paper strip I to the impression-roller H, and the said impression-roller H is furnished with flanges upon either side, which act as further guides to the paper.

The paper strip I is taken from a paper-roll J, supported upon a pin $h'$, passing through the forked standard K, attached to the base of the machine. The roll J is arranged obliquely in the casing, and the paper is guided by the flanged roller $i'$, so that it may pass directly to the printing mechanism. After it leaves the printing mechanism it is guided by an upwardly-turned plate $j'$ to the slotted shear-plate $k'$. To the said shear-plate is pivoted a cutting blade $l'$, the free end of which projects through the casing.

The wheel D is prevented from turning backward by a ratchet-wheel $m'$, secured to the shaft C, and a pawl $n'$, pivoted to the standard B. To the side of the casing A is attached a disk L, having in its periphery equidistant notches $o'$, which correspond in number with the electrotype-plates of the wheel D, and the crank C', secured to the shaft C, is slotted at its free extremity to receive the screw $p'$, which projects from the handle $q'$ through the slot. The screw also projects through washers $r'$, placed on opposite sides of the crank.

The spiral spring $s'$ inserted in the hole bored in the crank-arm presses against the side of the screw $p'$, and is held in place by a screw $t'$ inserted in the end of the crank-arm. The head of the screw $p'$ is fitted to the notches $o'$ of the disk L, so that by the engagement of the screw with the notched plate the wheel D is made to register in such a way as to bring the division-line between the different tickets even with the cutting-edge of the plate $k'$.

The operation of the improved ticket-printing machine is as follows: The wheel D is turned by means of the crank C', mounted upon the shaft C, and the serrated edges of the side plates of the said wheel engage the paper strip I, carrying it forward with a positive motion. The numbering-wheels having been adjusted to register the correct number in the manner already described, and the ink having been applied by the inking-roller G, the electrotypes and the number-wheels, by contact with the paper strip I, produce an impression upon the paper strip. The strip thus printed projects through the slot in the shears and through the slot of the casing, and any number of tickets may be separated from the strip by moving the shear-blade $l'$.

By providing ten electrotypes and ten sets of numbering-wheels, it is obvious that the machine will print a series of tickets numbering one thousand, which will differ from each other, and that by a continued operation of the machine a new series will be begun. It is also obvious that the number of electrotype-plates or the number of numbering-wheels, or both, may be increased, thus increasing the number of tickets in the series. It is also obvious that any plate bearing the required characters or marks may be used instead of the electrotype-plate, or rubber or metal type may be employed.

Having thus described the invention, what is claimed as new, and desired to be secured by Letters Patent, is—

1. In a ticket-printing machine, the combination, with a printing-wheel carrying series of electrotypes furnished with different serial letters or characters, of a series of number-wheels for each electrotype and means for moving the number-wheels once during each revolution of the printing-wheel, substantially as specified.

2. In a ticket-printing machine, the combination of the printing-wheel D, furnished with electrotypes E, the snail F', the pawls d, provided with the studs g, adapted to be engaged by the snail F', the number-wheels 1, furnished with the ratchet-wheels c, the number-wheels 2 3 4, and carrying mechanism consisting of ratchets c', the disk n, the plates o, and the crank-wires l, substantially as specified.

3. In a ticket-printing machine, the combination of the printing-wheel D, provided with the side plates a a', having serrated periphery for carrying the paper strip with a positive motion, the electrotypes E, fixed in the wheel D, the series of number-wheels F, the spring-supported inking-roller G, and the spring-pressed impression-roller H, substantially as specified.

SARAH R. MASSEY,
STANLEY A. BRYANT,
*Administrators of the estate of Gideon B. Massey, deceased, the inventor of the hereinabove-described improved ticket-printing machine.*

Witnesses:
EDWARD M. CLARK,
EDGAR TATE.